March 29, 1960 W. J. SENIOR 2,930,403
CONTROL VALVES FOR LIQUID PRESSURE CONTROL SYSTEMS
Filed Aug. 14, 1958 4 Sheets-Sheet 1
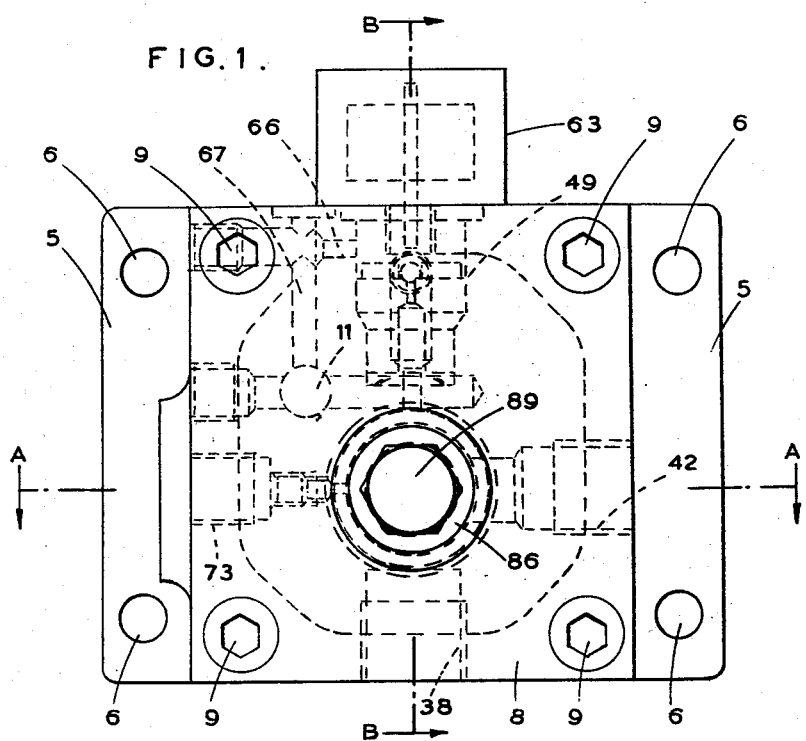
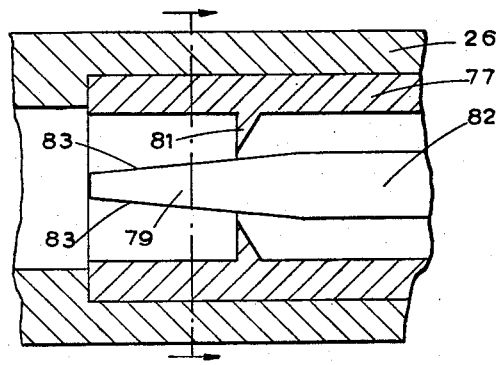 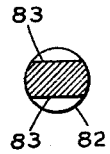
INVENTOR
William James Senior
BY
Stevens, Davis, Miller & Mosher
his ATTORNEYS March 29, 1960 W. J. SENIOR 2,930,403
CONTROL VALVES FOR LIQUID PRESSURE CONTROL SYSTEMS
Filed Aug. 14, 1958 4 Sheets-Sheet 2
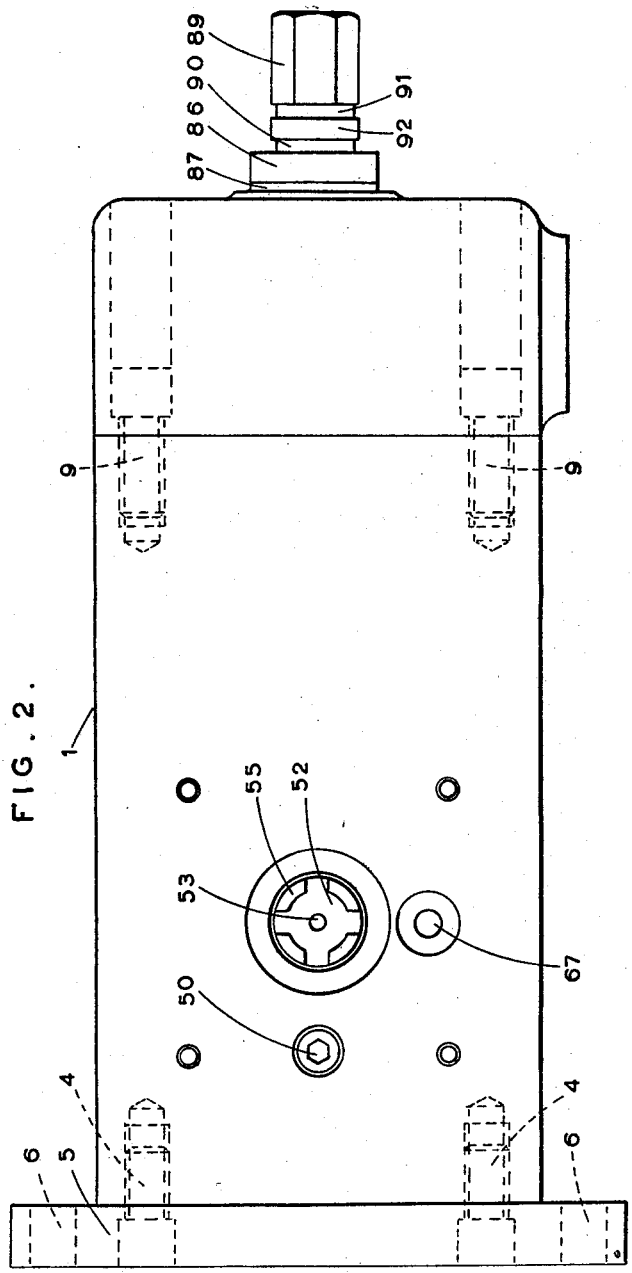
INVENTOR
William James Senior
BY
Stevens, Davis, Miller & Mosher
his ATTORNEYS

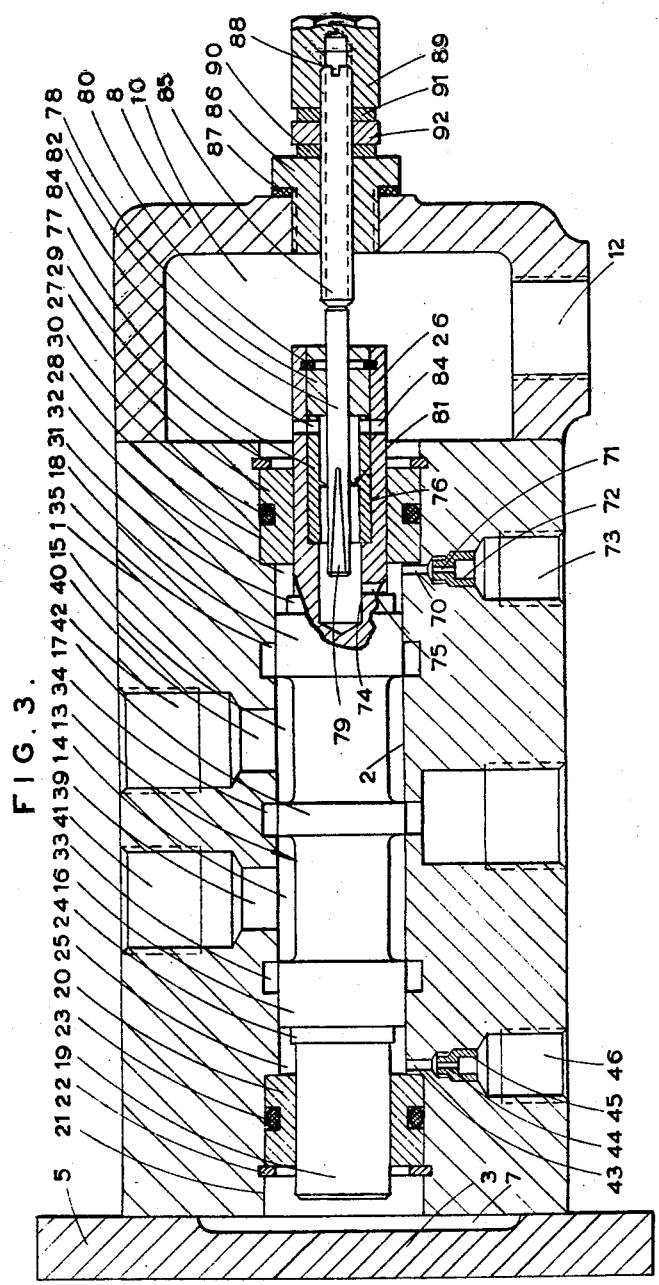

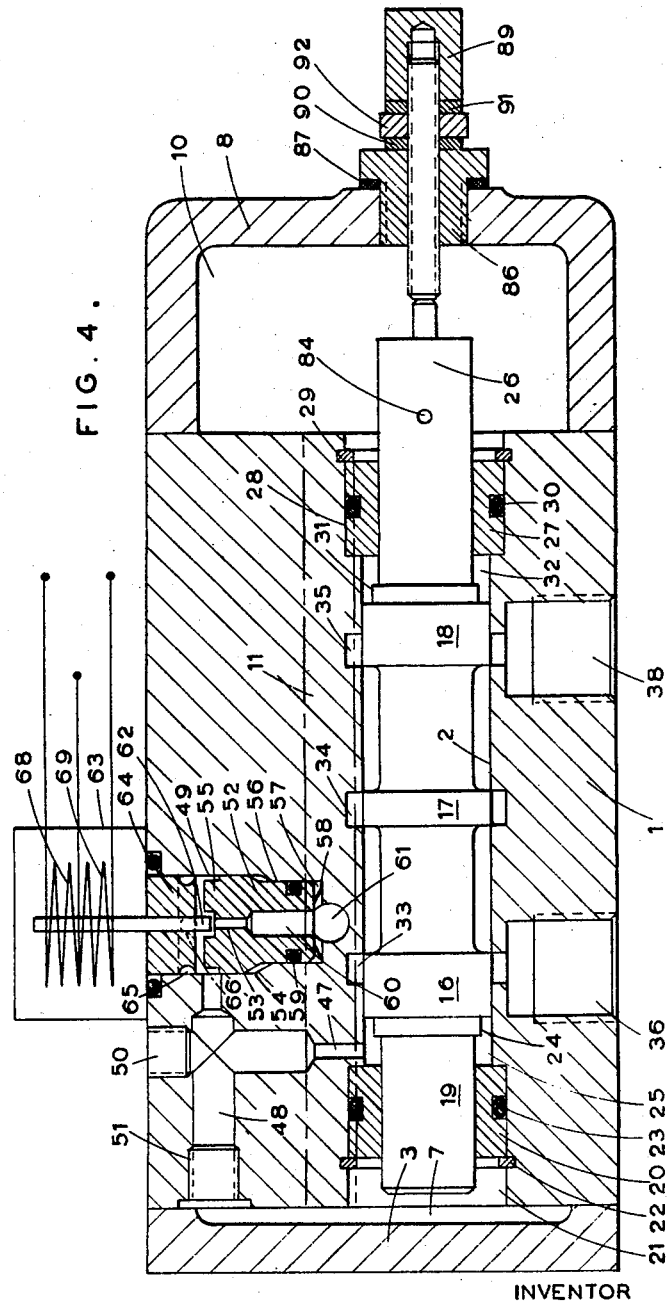

United States Patent Office 2,930,403
Patented Mar. 29, 1960

2,930,403

CONTROL VALVES FOR LIQUID PRESSURE CONTROL SYSTEMS

William James Senior, Leamington Spa, England, assignor to Automotive Products Company Limited, Leamington Spa, England Application August 14, 1958, Serial No. 754,962

Claims priority, application Great Britain August 19, 1957

6 Claims. (Cl. 137—623)

This invention relates to control valves for liquid pressure control systems, and has for its object to provide an extremely sensitive control valve capable of being operated by small electrical impulses, and capable of quick response to such impulses, so that it can respond accurately to a plurality of impulses following one another in rapid sequence. Another object of the invention is to provide a control valve in which the position to which the valve is moved, and therefore the resulting liquid flow, has a linear relation to the strength of the electrical impulse causing the valve movement.

According to the invention, in a control valve for a liquid pressure control system operating in response to electrical signals, a valve member movable in opposite directions from a neutral position to supply liquid under pressure to a motor device for moving it in opposite directions is subjected to opposing thrusts each generated by liquid in a chamber to which liquid under pressure is admitted through a flow-restricting orifice and from which liquid escapes through another flow-restricting orifice, one of said orifices associated with one chamber, and one of said orifices associated with the other chamber, being variable, the variable flow-restricting orifice associated with one chamber being varied by the electrical signals and the variable flow-restricting orifice associated with the other of said chambers being varied by the movement of the valve member resulting from the change of thrust due to change of the first variable orifice.

The variable flow-restricting orifices preferably control the outflow of liquid from the chambers, the variation of said orifices being effected by needle valve members.

One of said needle valve members is preferably controlled electro-magnetically by variation of the electric current flowing in one of two opposed coils in which the currents are normally balanced, and the other of said needle valve members is preferably controlled by relative movement of the valve body and the movable valve member. The needle valve members are preferably shaped so as to provide a linear relation between the electrical input signals and the resulting flow of liquid through the control valve.

An embodiment of the invention will now be described, by way of example, with reference to the accompanying drawings, in which:

Figure 1 is a view in end elevation of the control valve;

Figure 2 is a plan view with the control coil casing removed;

Figure 3 is a view taken in section on the line A—A of Figure 1;

Figure 4 is a view taken in section on the line B—B of Figure 1;

Figure 5 is a fragmentary sectional view to an enlarged scale of one of the needle valves; and Figure 6 is a view taken in section on the line C—C of Figure 5.

Referring to the drawings, the control valve has a body 1 of rectangular cross-section which is provided with a longitudinal through bore 2. The axis of the bore is centrally disposed with reference to the vertical sides of the body, and is disposed parallel to and below the longitudinal center-line of the body. A cover plate 3 is secured by screws 4 to one end of the body 1. The plate 3 is of the same depth as the body 1, and extends beyond the side faces of the body to form flanges 5 which are provided with holes 6 for the reception of bolts, studs or screws, whereby the valve body may be secured to a suitable support. The inner surface of the plate 3 has a wide shallow recess 7 which extends across the major part of the end face of the body 1.

The other end of the body 1 is provided with a hollow cap 8 which is secured to the body by screws 9. The interior of the cap forms a chamber 10 which extends across the major part of the end face of the body. The bore 2 opens into the recess 7 and the chamber 10 which are also connected by a passage 11 formed in the body 1 parallel to the bore 2. A lateral, screw-threaded opening 12 is provided in the cap 8 for a drain-pipe connection.

A cylindrical valve member, generally designated 13, is a slidable fit within the bore 2 and is formed with two annular recesses 14 and 15 which lie between a central land 17 and outer lands 16 and 18, respectively. The valve member has a terminal portion 19 of reduced diameter extending from the land 17 through a bushing 20 in which it is a fluid-tight sliding fit. The bushing 20 is disposed in a terminal enlargement of the bore 2 in which it is retained by a snap-ring 22. The bushing 20 carries a sealing ring 23 in an external annular groove. A shoulder 24 limits the movement of the valve member 13 towards the bushing 20. Between the bore 2 and the reduced terminal portion 19 of the valve member 13 and between the land 16 and the bushing 20 there is thus formed an annular chamber 25 in which liquid pressure can act to displace the valve member 13 longitudinally.

Similarly, at its other end, the valve member 13 has a reduced portion 26 extending from the land 18 with a fluid-tight sliding fit through a bushing 27 disposed in a terminal enlargement 28 of the bore 2. The bushing 27 is retained by a snap-ring 29 and carries a sealing ring 30 in an external annular groove. A shoulder 31 limits the movement of the valve member 13 towards the bushing 27. There is thus formed between the land 18 and the bushing 27 a chamber 32, similar to the chamber 25, in which liquid pressure can act to displace the valve member 13 longitudinally in the opposite direction to that in which it would be displaced by liquid pressure in the chamber 25. The chambers 25 and 32 are referred to hereinafter as the primary and reaction thrust chambers, respectively.

Three equally spaced circumferential grooves 33, 34 and 35 are formed in the bore 2. The grooves 33 and 35 communicate, respectively, with screw-threaded sockets 36 and 38 formed in the body 1, each of which is adapted to receive a connection for a pressure liquid supply pipe. The central groove 34 communicates with a screw-threaded socket 37 adapted to receive a connection for a drain-pipe for exhaust liquid. The annular recesses 14 and 15 in the valve member 13 are permanently in communication, respectively, with ports 39 and 40 which open, respectively, into screw-threaded sockets 41 and 42 adapted to receive connection for pipes communicating with opposite sides of the piston of a double-acting liquid-pressure motor.

When the valve member 13 is in a neutral position, the central land 17 covers the central groove 34, the land 17 and the groove 34 being substantially of the same width. In the neutral position of the valve also, the grooves 33 and 35 are covered by the lands 16 and 18, respectively, the inner edges of the lands being in register with the inner edges of the grooves. The width of the lands 16 and 18 is such that the grooves 33 and 35 are only uncovered when the valve member 13 is moved from its neutral position towards that end of the body 1 to which the respective groove 33 or 35 is nearer.

Liquid under pressure is admitted to the primary thrust chamber 25 by a passage 43 leading from a flow-restricting orifice 44 in a plug 45, which is disposed in the base of a screw-threaded socket 46 adapted to receive a connection for a pressure fluid supply pipe. A transverse outlet passage 47 from the chamber 25 is increased in diameter and intersects a large, longitudinal passage 48, a reduced extension of which communicates with a transversely disposed cylindrical chamber 49. The passages 47 and 48, which are bored from the side and end walls of the body, respectively, are closed by plugs 50 and 51.

A plug 52 having a flow-restricting orifice 53 is disposed in the chamber 49. The plug 52 has a screw-threaded portion 54 and tool engaging faces 55, whereby it is screwed into the chamber 49, and has a reduced extension 56 fitting the correspondingly reduced base of the chamber 49, constituting a chamber 57. The plug bears on a dished spring washer 58 and has a circumferential groove carrying a sealing ring 59. The orifice 53 opens into an enlarged central bore 60 communicating with the chamber 57 which is connected by a transverse passage 61 to the longitudinal drain passage 11.

The orifice 53 is controlled by an electromagnetically operated needle valve member 62 which extends from a control coil casing 63 secured to the top of the valve body 1. A spigot 64 of the casing 63 fits within the chamber 49 and has a peripheral groove 65 which registers with a port 66 communicating by way of a passage 67 with the drain passage 11. A pair of oppositely wound coils 68 and 69 surround the spindle of the needle valve 62.

Liquid under pressure is admitted to the reaction thrust chamber 32 by a passage 70 leading from a flow-restricting orifice 71 in a plug 72 which is disposed in the base of a screw-threaded socket 73 adapted to receive a connection for a pressure fluid supply pipe.

The reduced end 26 of the valve member 13 has a central bore 74 which communicates with the reaction thrust chamber 32 by means of radial passages 75 of which one is shown in Figure 3. The bore 74 is enlarged at 76 to receive a bushing 77 of substantially the same internal diameter as the bore 74 and a bushing 78 of smaller internal diameter than the bushing 77. A needle valve member 79 is a sliding fit in the bushing 78 which is held in position by a spring retaining ring 80. A circular knife-edged orifice 81 is formed by an internal flange in the bushing 77. The stem 82 of the needle valve 79 is a sliding fit within the orifice 81 and has at its end a pair of diametrically opposite converging flat surfaces 83, whereby the effective area of the orifice is controlled by relative movement of the control valve member 13 and the needle valve member 79. Fuild passing through the orifice 81 escapes to the chamber 10 and the drain outlet 12 by means of ports 84 in the bushing 77 and the control valve extension 26.

The needle valve member 79 is supported by an adjustable abutment in the form of a stem 85 which is screwed into a bushing 86 carried by the cap 8. The bushing 86 is screwed into an opening in the cap and has a flange which is adapted to compress a gasket 87. The stem 85 has a driver slot 88 and a cap nut 89 which compresses a pair of packing rings 90 and 91 separated by a washer 92.

It will be apparent that, with a predetermined relationship between the currents flowing in the control coils 68 and 69, the needle valve member 62 will take up a certain position relative to the orifice which it controls, and the abutment stem 85 engaged by the needle valve member 79 can then be adjusted until the pressure in the reaction thrust chamber 32 is equal to the pressure in the primary thrust chamber 25, and the control valve member 13 takes up a neutral position in which the pressure supply grooves 33 and 35 and the drain groove 34 are closed by the lands 16 and 18 and 17, respectively.

If the current in one of the control coils is changed, the needle valve member 62 will be moved, and the pressure in the primary thrust chamber 25 will be increased or reduced. For instance, if the needle valve member 62 is moved downwards, the pressure in the chamber 25 will be increased, and the control valve member 13 will be moved towards the right, as seen in Figures 3 and 4. Consequently the effective area of the variable orifice 81 will be reduced, and the pressure in the reaction thrust chamber 32 will rise, until the thrusts in the chambers 25 and 32 balance each other. The movement of the control valve member 13 then ceases at a position in which liquid is able to flow from the motor to operate it, the flow continuing so long as the electrical signal is maintained. If the needle valve member 62 is moved upwards the pressure in the chamber 25 will be reduced, and the control valve member 13 will be moved to the left causing the area of the orifice 81 to be increased so as again to equalize the pressures in the thrust chambers 25 and 32.

Preferably the needle valve members are so designed that there is a linear relationship between the rate of fluid flow to the motor and the strength of the electrical impulse. This condition will be realised if the movements of the needle valve member 62 and of the control valve 13 have a linear relationship, the movement of the control valve member 13 being equivalent to the relative movement of the orifice 81 and the needle valve member 79. If the variable orifices are circular, as is usual, the relationship between the needle valve movements and the increase of pressure will not be linear but, provided that the relationship for each needle valve follows the same law the desired relationship between the fluid flow and the electrical signals will be maintained. The needle valves need not be of the same shape so long as the pressure and movement relationship follows the same law for each valve.

The valve according to the present invention has the following important advantages.

The fact that the control orifices are not of very small dimensions reduces the limits to which filtration of the working liquid must be carried.

The use of annular thrust chambers, as compared with thrust chambers in which liquid acts on the full area of the spool, reduces the liquid displacement for a given spool movement and provides a more rapid response.

The needle valve members controlling the variable orifices can readily be shaped to give the required linear relationship between the input signals and the liquid flow through the valve.

The maximum rate of response of the valve can be readily changed by altering the characteristics of the fixed orifices through which liquid enters the thrust chambers.

I claim:

1. A control valve for a liquid pressure control system operating in response to electrical signals, including a housing, a valve member movable in the housing in opposite directions from a neutral position to supply liquid under pressure to a motor device for moving it in opposite directions, said housing and the valve member defining thrust chambers at opposite ends of the valve member, said valve member being subjected to opposing thrusts each generated by liquid in the chambers, each chamber having a flow-restricting orifice through which liquid under pressure is admitted to the chamber and having a flow-restricting orifice from which liquid escapes from the chambers, one of said orifices associated with one chamber and one of said orifices associated with the other chamber being variable, valve means controlling said variable orifices, electrically controlled means responsive to variations of electrical signals for operating the valve means associated with the variable orifice of one chamber and the valve means associated with the variable orifice of the other chamber being controlled by the movement of the valve member resulting from the change in thrust due to the change of the variable orifice of the one chamber.

2. A control valve according to claim 1, wherein the valve means includes needle valve members which control the outflow of liquid from the thrust chambers.

3. A control valve according to claim 2, wherein one of said needle valve members is actuated electromagnetically by variation of the current flowing in one of two opposed coils in which the currents are normally balanced.

4. A control valve according to claim 3, wherein the other of said needle valve members is actuated by relative movement of the control valve member and the housing.

5. A control valve as claimed in claim 4, wherein the other of the needle valve members is held by fluid pressure against an adjustable abutment.

6. A control valve, according to claim 1, wherein said other orifices are not variable and are defined by detachable elements.

References Cited in the file of this patent
UNITED STATES PATENTS

| | | |
|---|---|---|
| 2,236,467 | Clench | Mar. 25, 1941 |
| 2,396,951 | Harstmann | Mar. 19, 1946 |
| 2,582,088 | Walthers | Jan. 8, 1952 |
| 2,709,421 | Avery | May 31, 1955 |
| 2,790,427 | Carson | Apr. 30, 1957 |
| 2,814,487 | Medkeff | Nov. 26, 1957 |